United States Patent [19]
Pietrowski

[11] Patent Number: 5,218,535
[45] Date of Patent: Jun. 8, 1993

[54] METHOD AND APPARATUS FOR DATA ACQUISITION

[76] Inventor: David A. Pietrowski, 2700 Steamboat Springs, Rochester Hills, Mich. 48073

[21] Appl. No.: 727,020

[22] Filed: Jul. 8, 1991

[51] Int. Cl.[5] ............................................. G06F 15/38
[52] U.S. Cl. ................................................... 364/419
[58] Field of Search ............... 364/413.01, 413.02, 364/419; 235/379; 273/249, 430; 434/308, 335, 319, 157

[56] References Cited

U.S. PATENT DOCUMENTS

| | | | |
|---|---|---|---|
| 4,593,904 | 6/1986 | Graves | 273/430 |
| 4,829,431 | 5/1989 | Ott et al. | 364/419 |
| 4,891,786 | 1/1990 | Goldwasser | 364/419 |

Primary Examiner—Roy N. Envall, Jr.
Assistant Examiner—Khai Tran
Attorney, Agent, or Firm—Gossett Dykema

[57] ABSTRACT

A method and apparatus 10 is disclosed for displaying a sequence of questions, for soliciting answers to these questions, for receiving the answers, and for storing the answers for later analysis. This methodology and apparatus 10 includes the use of a keypad which may be generated upon a display 18 by use of a timing interrupt signal, emanating from an operating system 66. This keypad may also be moved to several predetermined positions upon display 18.

1 Claim, 5 Drawing Sheets

METHOD AND APPARATUS FOR DATA ACQUISITION

BACKGROUND OF THE INVENTION

1. Field of the Invention

This invention generally relates to a method and an apparatus for data acquisition and more particularly, to a method and apparatus for displaying a sequence of questions, prompting answers to each of the questions, receiving the answers, and storing and analyzing the received answers.

2. Discussion

Many types of techniques are used to acquire and analyze consumer product data in order to ascertain overall consumer acceptance and opinion concerning various products.

Examples of these prior techniques include telephone surveys, as well as direct interview type surveys requiring an interviewer to put forth a series of questions to the interviewee and to record the solicited answers and thoughts, in a log book or journal. While these prior techniques have been useful, they suffer from many drawbacks.

Since these surveys require many interviewers, they have usually been found to be rather costly, inefficient, and incorrect, due to interviewer error. Additionally, the presence of an interviewer has been found to make an interviewee somewhat uneasy, thereby inhibiting the interviewee from giving a full and accurate response to the various questions and also inhibiting the generation of an unsolicited and extemporaneous interviewee response.

SUMMARY OF THE INVENTION

It is, therefore, a primary object of this invention to provide a method and apparatus for efficiently generating a series of questions, soliciting answers to these questions, and receiving and storing the answers in a manner which will allow the answers to be later analyzed.

It is another object of this invention to provide a computer based apparatus which allows a number of questions to be selectively developed by a user and which allows the user to selectively sequence and solicit answers to the questions.

It is yet another object of this invention to provide a computer based apparatus which allows certain questions to be presented to an interviewee and which efficiently allows the interviewee to select one of several possible answers to the questions.

According to a first aspect of the present invention, an apparatus for obtaining answers to certain questions is provided. This apparatus comprises processing means for storing and selectively displaying the certain questions; and input means, coupled to the processing means, for allowing answers to each of the questions to be input to the processing means at selected and predefined intervals of time.

Further objects, features and advantages of the invention will become parent from a consideration of the following description and claims, when taken in conjunction with the accompanying drawings.

BRIEF DESCRIPTION OF THE DRAWINGS

Various advantages of the present invention will become parent to those skilled in the art by reading the following specification and reference to the following drawings in which.

DETAILED DESCRIPTION OF THE INVENTION

Figure 1:
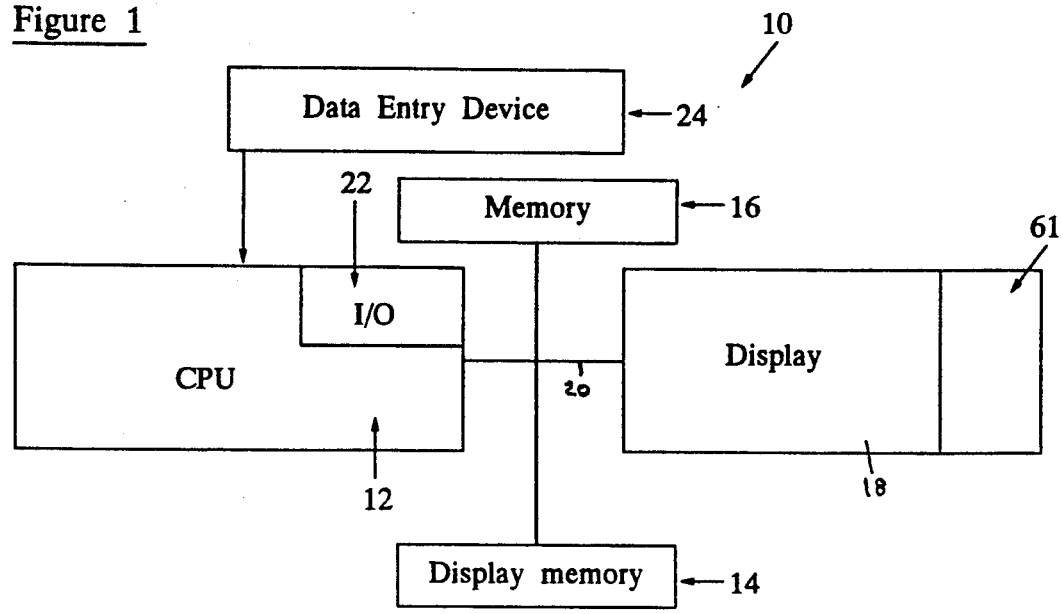
FIG. 1 is a block diagram of the data acquisition apparatus, made in accordance with the teachings of the preferred embodiment of this invention.

Referring now to FIG. 1 there is shown a data acquisition apparatus 10, made in accordance with the teachings of the preferred embodiment of this invention, and including a central processing unit 12 coupled to a display memory 14, an executable memory 16, and a display 18, by means of bus 20. Further, central processing unit 12 includes an input/output buffer portion 22, adapted to be coupled to a typical data entry device 24.

In practice, device 24 may comprise one of several types of devices such as a light pen, mouse, or keyboard. As will be seen, device 24 is only used, by a user of apparatus 10, to select one of several possible answers to one of several automatically and sequentially displayed questions, on display 18.

Figure 2:
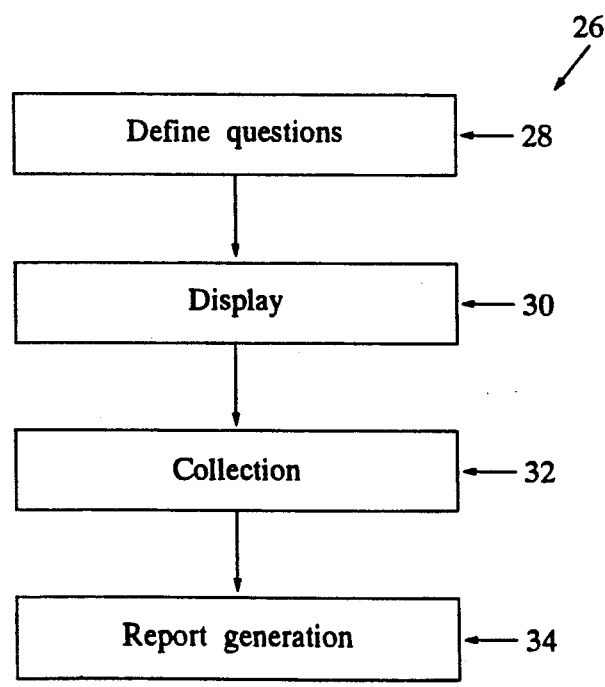
FIG. 2 is a flowchart illustrating the general sequence of steps associated with the operation of the apparatus shown in FIG. 1.

The general operation associated with apparatus 10 is shown in the sequence of steps associated with flowchart 26, of FIG. 2. Specifically, flowchart 26 includes an initial step 28 in which a user of apparatus 10 defines the type and text of each of the questions that will be asked of a perspective interviewee. The text and sequence of questions is then fixed, by processor 12, in a manner which will be explained. Step 28 is followed by step 30 in which each of the textual questions is displayed, upon display 18 in the previously specified sequence.

As each of these questions is displayed, an interviewee is solicited to select one of several answers, and in step 32, each of the interviewee's answers is collected in an answer database. Step 34 then follows step 32 and, in this step, central processing unit 12 generates a report based upon the answers obtained to the previously defined questions. In this manner, a series of questions may be efficiently generated to a number of interviewee's, and each of the interviewee's answers may be collected in a single database in order that a single statistical report may later be generated, based upon the obtained sample of answers.

It should therefore be obvious to one of ordinary skill in the art, that apparatus 10 allows for the efficient generation of questions and the efficient obtainment of a statistical database, based upon the answers to each of these questions. Further, it should also be obvious to one of ordinary skill in the art, that apparatus 10 obviates the need for a separate interviewer to be present during each of the interviews and data collection processes and further eliminates the errors associated with the recording of data, by each of the interviewers. Therefore, the data collection apparatus 10, in the preferred embodiment of this invention, is not only more efficient and cost effective, but is also more reliable.

Figure 3:
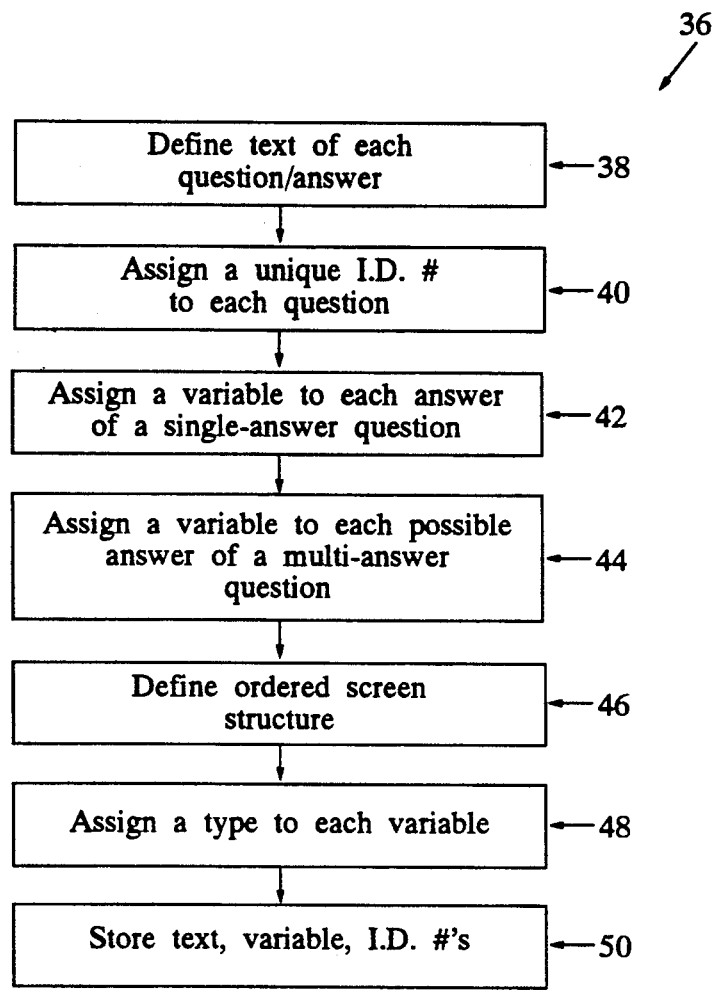
FIG. 3 is a flowchart illustrating the sequence of steps associated with the step of "define questions", shown in FIG. 2.

Referring now to FIG. 3, there is shown a flowchart 36, illustrating a sequence of steps associated with step 28, of flowchart 26. Specifically, flowchart 36 includes an initial step 38 in which a user of system 10 is made to define the text of each of the desired questions and the text of each of the possible answers, which may be selected by an interviewee, in response to each respective question. Step 38 is followed by step 40 and, in this step, a user of system 10 is made to assign a unique identification number to each of the questions, created in step 38.

Step 42 follows step 40 and, in this step, a user of system 10 is made to assign a unique variable to each of the possible answers associated with a single answer question, of step 38. Step 44 follows step 42 and, in this step, a user of system 10 is further made to assign a unique variable to each possible answer of each of the multi answer questions, created in step 38.

Step 46 follows step 44 and, in this step, a user of system 10 is made to define the display sequence of each of the created questions, in step 38 and is further made to define the exact screen placement of each of the textual fields, associated with the questions. In step 48, a system user is made to assign a type to each of the defined variables in steps 42 and 44. Specifically, this type definition includes the data length associated with each of these answers as well as the number of possible answers associated with the question to which this variable has been assigned. Step 50 follows step 48 and, in this step, a user of system 10 is made to store the text associated with the created questions and answers, the associated variables, and the unique identifications numbers associated with each question, within memory 16. In this manner, central processing unit 12 may selectively and sequentially cause the textual questions and answers to be sequentially read from memory 16, placed into display memory 14, and displayed onto display 18. Thereafter, device 24 may be then used by an interviewee to select a specific answer data field, by device 24.

Figure 4:
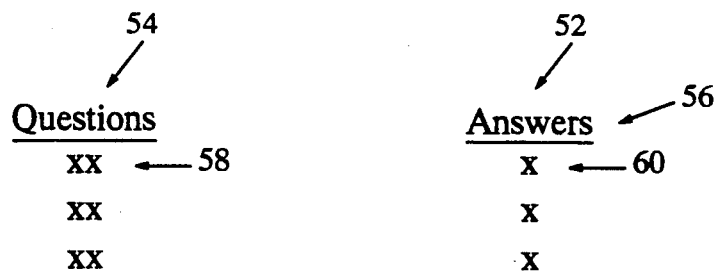
FIG. 4 is an illustration of the manner in which the questions and answers are stored in the apparatus of FIG. 1.

As shown in FIG. 4, a database 52 is created by processor 12, and stored in memory 16, as the individual questions are answered. Specifically, database 52 has two columnar segments 54 and 56, each having the associated question identification numbers 58 and associated answers 60 as row entries. In this manner, each of the questions will have an associated answer 60 uniquely assigned to it and stored for later analysis, by processor 12. Such analysis may be related to the instances of a specific answer, such as that indicating no knowledge on the part of the interviewee or it may be related to such demographic statistics such as the interviewee's age, sex, or marital status. By use of apparatus 10 with a large sample of interviewees, a database 52 may be generated and analyzed so that specific consumer profiles may be generated in a desired manner.

Figure 5:
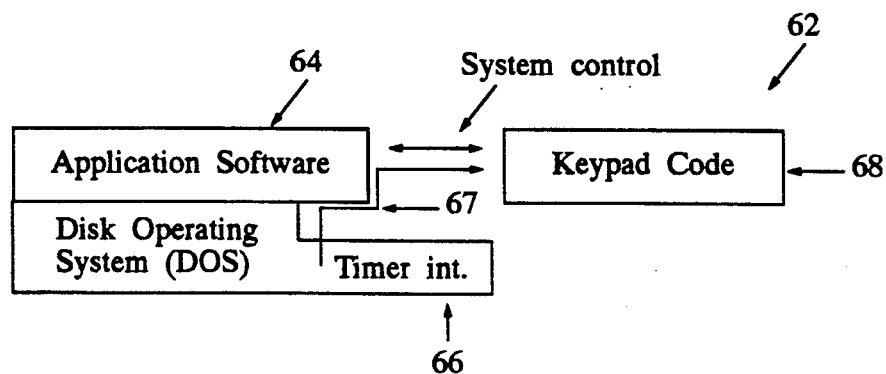
FIG. 5 is a software architectural diagram illustrating the use of a timer interrupt signal by the apparatus of FIG. 1.

In order to efficiently allow an interviewee to efficiently respond and answer each of the questions, it is desirable to define a portion of display 18 as an answer selection portion. In one embodiment, this portion 61 is configured in the form of a keypad. Specifically, portion 61, in the preferred embodiment of this invention, is activated with a light pen, mouse, or keyboard. Moreover, this activation simply allows one of the answer variables to be selected. The use of keypad 61, with apparatus 10 is shown in software architectural diagram 62, of FIG. 5.

As shown, application software 64 associated with the sequence of steps shown in flowcharts 26 and 36 and resident within central processing unit 12, normally utilizes the disk operating system (DOS), produced by the IBM Corporation of Armonk, N.Y. Specifically, this operating system 66 may be used by processor 12 only if the processor is compatible with certain types of IBM generated software. One example of such a processor 12 is that of a model "386", manufactured by the Intel Corporation of Sunnyvale, Calif. Therefore, in the preferred embodiment of this invention, processor 12 must comprise an IBM compatible processor.

Figure 6:
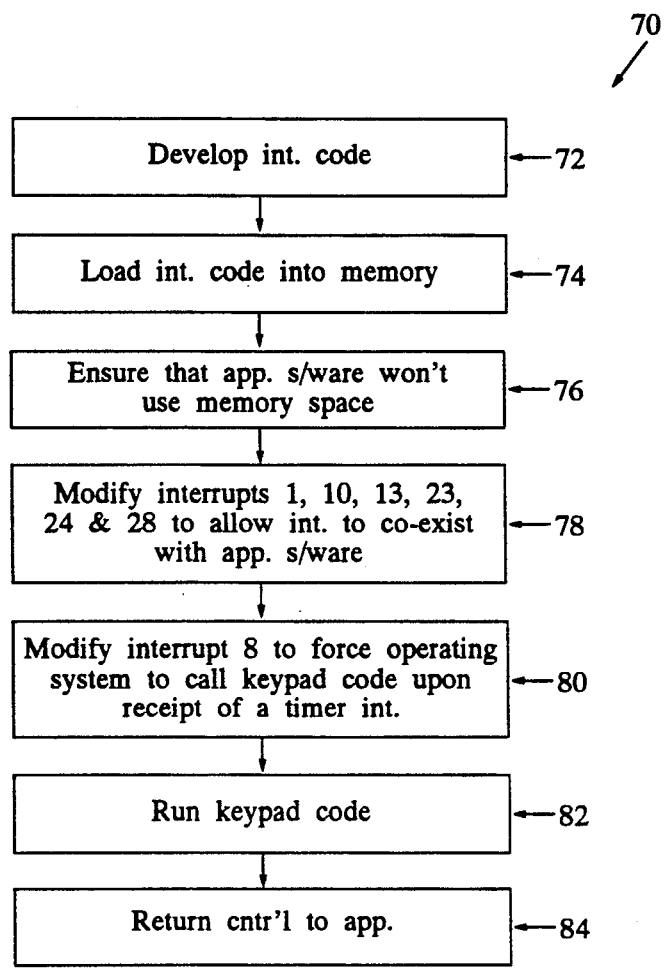
FIG. 6 is a flowchart illustrating the sequence of steps associated with the use of a keypad by the apparatus of FIG. 1.

As shown, a keypad is made to be displayed upon display 18, by use of typical timer interrupt signal 67 which is made to be generated by operating system 66 and which allows a certain predefined executable code 68 to operate within apparatus 10, in place of the application software 64. That is, code 68 actually takes control of processor 12 from software 64, upon the generation of the timer interrupt from operating system 66. The use of this interrupt and keypad executable code is shown more specifically in flowchart 70, of FIG. 6.

Specifically, flowchart 70 includes a first step 72 in which a user of system 10 must develop the interrupt or keypad generating code. This code is then loaded into executable memory 16, in step 74. Step 76 follows step 74 and, in this step, a user of system 10 must assure that the application software 64 will not use the same space of memory 16, that the executable code associated with steps 72 and 74 is placed into. This is done by modifying the memory pointers, associated with the application software 64, in order to prevent software 64 from ever utilizing any portion of memory 16, that the interrupt-/keypad code is resident within.

Step 78 follows step 76 and, in this step, a user of system 10 must appropriately modify typical DOS interrupt signals 1B, 10, 13, 23, 24, and 28 to allow the interrupt/keypad code to coexist with application software 64. This modification is detailed in the book entitled "Systems Programming in Microsoft C", authored by Michael J. Young (Library of Congress No. 89-61318), and deals with the interrupt modifications needed to allow a timing interrupt signal to coexist with application software, in a disk operating system (DOS) environment.

Step 80 follows step 78 and, in this step, a user of system 10 must modify DOS interrupt signal number 8, to force the operating system 66 to call the keypad code, from memory 16, upon generation of a timing interrupt signal by operating system 66. After the code has been called by operating system 66, it is executed by processor 12, as shown in step 82. After the execution of the interrupt code, in step 82, the control is returned to application software 64 until the next generation of a timer interrupt signal, by operating system 66. This return of control is shown in step 84.

It should be apparent then to one of ordinary skill in the art that the keypad code will be run by processor 12 every time a timer interrupt is generated by operating system 66. In this manner, a keypad will be displayed upon display 18 approximately every 18.2 times per second (in the preferred embodiment of this invention) and during this display period, an interviewee may respond to a displayed question, by use of the keypad 61. Further, it has been found that if the application software 64 employs screen scrolling, the keypad should occupy columns 1-5 or 76-80 on an 80 column display screen and that if the application software 64 is continually refreshing the display screen (i.e. a full screen at a time) that the keypad can be placed substantially anywhere upon the screen. Further, application software 64 could also be used to generate the keypad 61 by use of a timing interrupt signal which is used only to interpret any sort of input generated by an interviewee, in response to the application generated keypad.

In the preferred embodiment of this invention, the displayed keypad is created by use of microsoft "C" and microsoft assembly language commands and is specifically comprised by "SCRPUTS" commands. For instance, the following commands (explained in the text entitled "System Programming In Microsoft C") may be used to generate a portion of the keypad (i.e. the portion corresponding to the numeral "1"):

| | | | |
|---|---|---|---|
| SCRPUTS | ( "⌈⌉", 0x0f, | Variable for screen row, | Variable for screen column ) |
| SCRPUTS | ( "\|1\|", 0x0f, | Variable for screen row, | Variable for screen column ) |
| SCRPUTS | ( "\| \|", 0x0f, | Variable for screen row, | Variable for screen column ) |

In this manner, the executable keypad code is actually placed into display memory 14, from memory 16, during the generation of a timer interrupt signal. Accordingly, it should be readily apparent to one of ordinary skill in the art, that the keypad/interrupt software, once resident in memory 14, is automatically displayed upon the defined portion of display 18.

It should also be apparent to one of ordinary skill in the art that prior timing interrupt configurations save the contents of display or video memory 14, paint a portion of the screen 18, carry out at designated function, and then restored the screen to its previous state. However, the timing signal interrupt embodiment of this invention, does not save and restore display 18 but rather continually paints or refreshes a portion 61 of display 18, upon the generation of each of the timing interrupts signals, emanating from operating system 66. In this manner, the keypad 61 may be used with virtually any type of application software 64 and allows for an efficient generation of data or response to a given textual question, by an interviewee.

Figure 7:
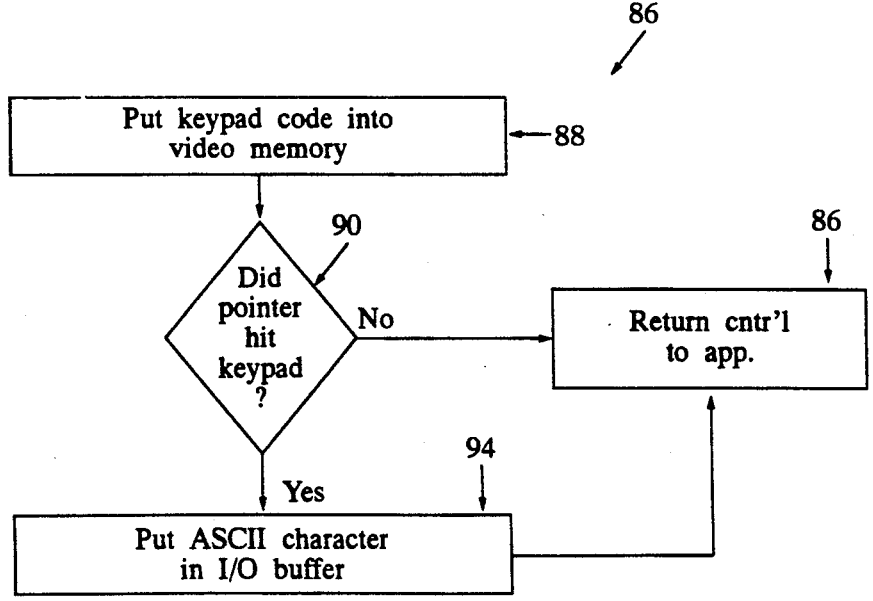
FIG. 7 is a sequence of steps associated with the step of "run keypad code", shown in FIG. 6.
Figure 8:
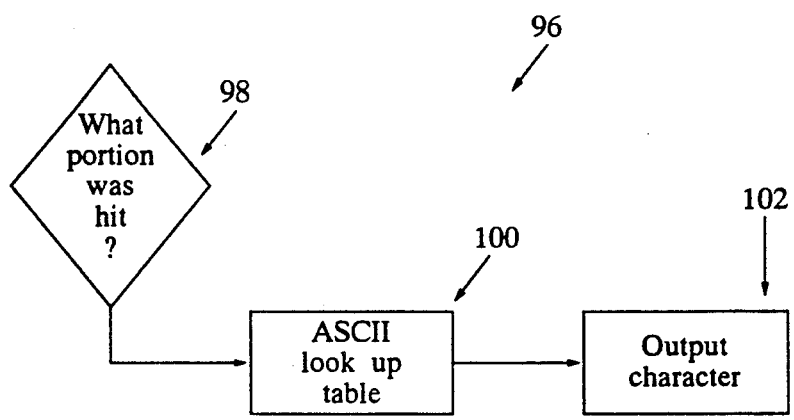
FIG. 8 is a sequence of steps associated with the step of determining what portion of the keypad was selected, as shown in FIG. 7.

Referring now to FIG. 7, there is shown a flowchart 86 which shows the sequence of steps associated with the running of the keypad code, of step 82. Specifically, flowchart 86 has an initial step 88 in which the keypad code is put into a video or display memory 14. After the code has been placed in memory 14, processing unit 12 must determine whether the pointer or data entry device 24 actually hit or selected any portion of the keypad 61, as shown in step 90. If a portion of the keypad 61 was not "hit" or selected during the generation of the timing signal interrupt, the control is returned to the application software 64, as shown in step 92. If the pointer or data entry device 24 did select a portion of the keypad 61, in step 90, then step 94 follows step 90 in which an ASCII character is placed into the input/output buffer 22. In this manner, central processing unit 12 is made to receive an ASCII character in virtually the same manner as if the character was directly input to it by a keyboard device. The generation of an ASCII character into buffer 22 is shown in flowchart 96, of FIG. 8.

Figure 9:
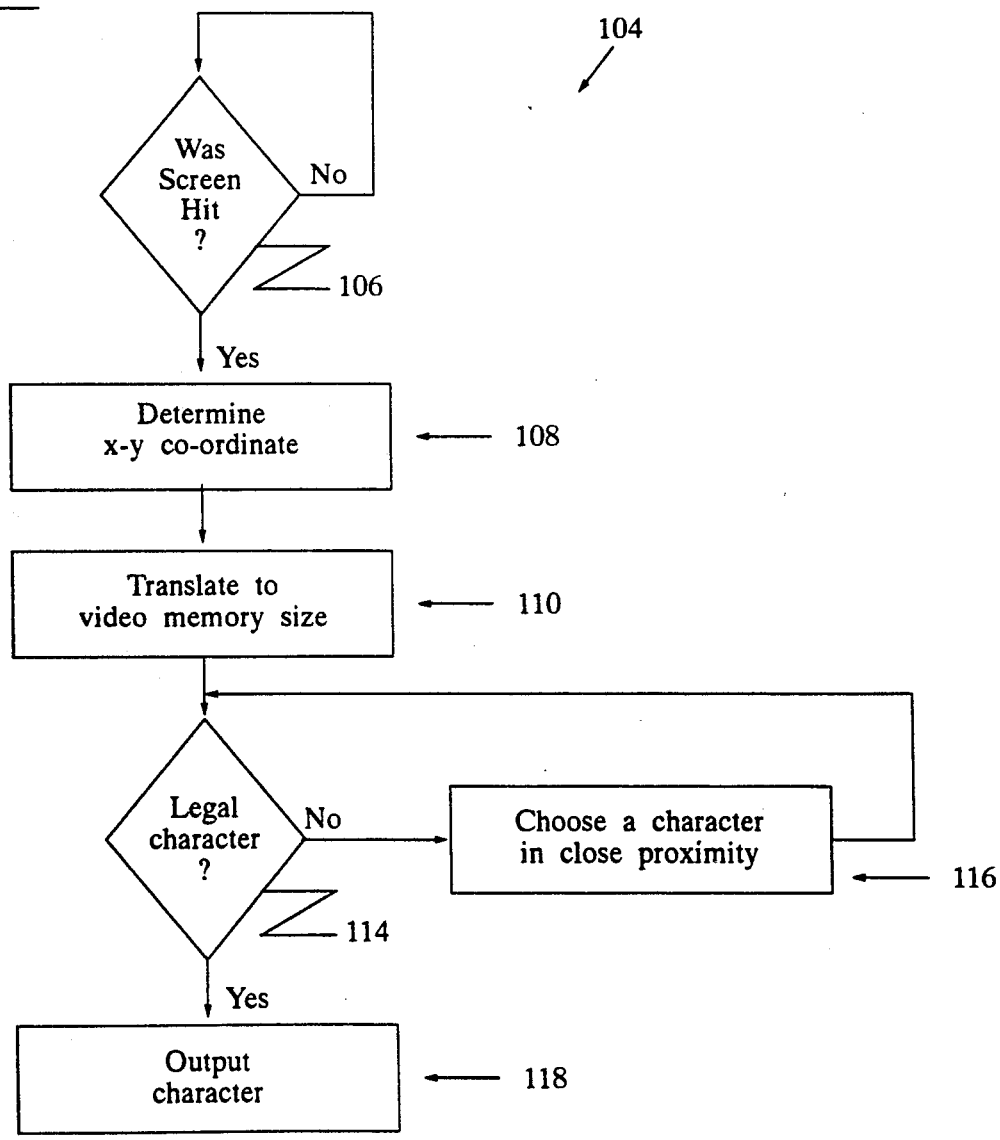
FIG. 9 is an illustration of a sequence of steps associated with a second methodology of the keypad portion determining step of FIG. 7.

Specifically, flowchart 96 has an initial step 98 which requires processing unit 12 to determine exactly what keypad portion was hit or selected, by device 24. After this portion is determined, step 98 is followed by step 100 in which an ASCII look-up table is used (which may be resident within central processing unit 12) to determine exactly what ASCII character corresponded to the selected portion. Once the character has been selected, step 100 is followed by step 102 in which the character is output to input/output buffer portion 22. It should be noted that before any character is placed into buffer 22, the buffer is flushed of any residual characters by the following comand: Kbd flush ( );

A second embodiment or methodology associated with the placement of a character into buffer 22, as shown in flowchart 104, of FIG. 9. Specifically, flowchart 104 includes an initial step 106 in which central processing 12 must determine which portion of the screen or display 18 was selected. Step 108 follows step 106 in which processor 12 must determine the X—Y coordinates of display 18 and must then, in step 110, translate these coordinates to the coordinates associated with the display or video memory 14.

Figure 10A:
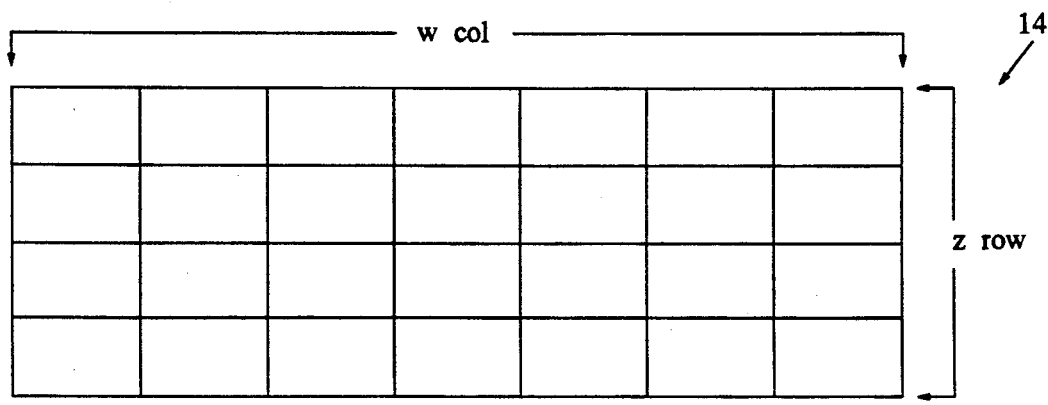
FIGS. 10(A-B) are respective illustrations of the data display pattern in a video memory and display screen, associated with the apparatus shown in FIG. 1.
Figure 10B:
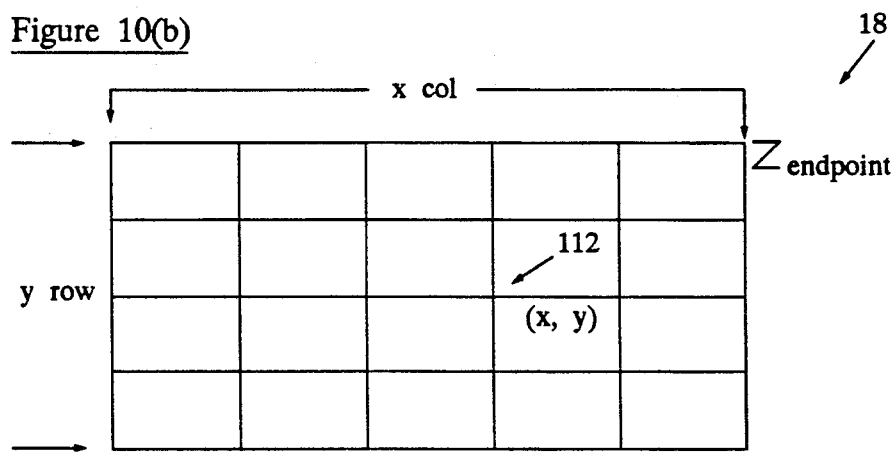

The coordinates of display 18 and memory 14 are respectively shown in FIG. 10(B) and FIG. 10(A). As shown, a point 112, upon display 18 may have a particular X and Y value corresponding to the column and row that it resides within. Moreover, as shown, display 18 has an origin corresponding to the leftmost column and topmost row, displayed upon display 18, and an endpoint corresponding to the rightmost column and topmost row.

To translate the position of point 112, from display 18 to memory 14 requires the following mathematical calculation:

$$\text{Memory column coordinate} = \frac{(X \text{ value} - \text{origin})}{(\text{endpoint} - \text{origin})} (W\text{col})$$

$$\text{Memory row coordinate} = \frac{(Y \text{ value} - \text{origin})}{(\text{endpoint} - \text{origin})} (Z\text{row})$$

where Wcol=number of columns contained within memory 14 and where Zrow=number of rows contained within memory 14.

In this manner, it should be apparent to one of ordinary skill in the art that one may translate the position of a point 112, upon display 18, to a corresponding position within video or display memory 14. Such a translation is achieved in step 110 and, after such translation is completed, central processing unit 12 must determine, in step 114, whether the corresponding character associated with the translated location in the video memory is a character which is a possible answer to the textual question presented to the interviewee. If the answer is not a "legal" answer, than central processing unit 12 is directed to choose a character in close proximity to this character, in step 116. Step 116 is then followed by step 114 and if the chosen character is still not acceptable, step 116 is again performed. The sequence of characters chosen in close proximity to the original chosen character, in step 114, may be determined by a user of apparatus 10, according to a predefined character pattern, within memory 14. If, however, the character first chosen in step 110 is valid, step 114 is followed by step 118 in which the character is output to the input/output buffer 22.

It should be apparent to one of ordinary skill in the art that central processing unit 12, in the foregoing manner, may also be used for character recognition analysis in which various characters or points are recognized on screen 14 and translated to memory 18. Thereafter, a determination is made as to whether these sequence of characters are valid. If such character or signature recognition is valid, central processing unit 12 may then perform some user desired function. Alternatively, upon such character recognition, central processing unit 12 may be directed to highlight or to inform a user of apparatus 10 that such a signature has in fact been recognized.

Figure 11:
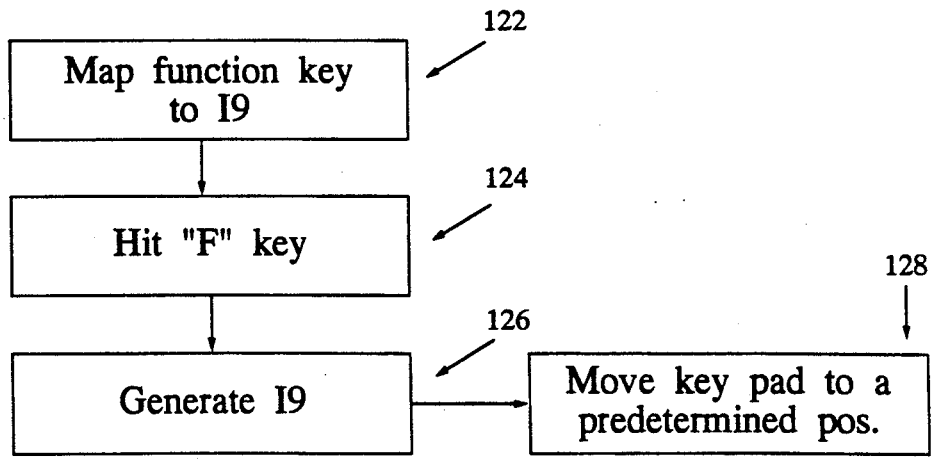
FIG. 11 is a sequence of steps associated with the movement of the keypad, of the apparatus of FIG. 1.

Further, as shown in flowchart 120 of FIG. 11, the keypad 61 may further be moved to a selected location upon display 18. That is, flowchart 120 includes an initial step 122 in which a user of apparatus 10 maps a function key to DOS interrupt signal number 9, as explained in the book entitled "Systems Programming in Microsoft "C"". Step 122 is followed by step 124 in which a user of apparatus 10 is then directed to hit the function key and to generate the DOS interrupt signal number 9 in step 126. The generation of interrupt signal number 9, by operating system 66, causes the keypad to move to a predetermined position, upon screen 18. This movement is shown in step 128. In this manner, a user may move the keypad to any sort of desired location upon display 18, to make the interviewee's response to the questions more sufficient.

It is to be understood that the invention is not limited to the exact construction or method illustrated and described above, but that various changes and modifications may be made without departing from the spirit and scope of the invention, as defined in the following claims.

I claim:

1. A method for obtaining answers to a certain question, said method comprising the steps of:
   defining said question;
   defining each possible answer to said question;
   storing said question within a computer;
   storing said answers within said computer;
   displaying said question upon a screen of said computer;
   displaying said possible answers upon said computer screen;
   associating each answer with a unique indice;
   displaying said indices;
   painting a keypad upon a predefined portion of said computer screen only at substantially identical and predefined intervals of time, said identical and predefined intervals of time being independent from a time that said indices are displayed:
   selecting one of said answers by use of said keypad only during one of said predefined intervals of time; and
   storing each of said selected answers within said computer.

* * * * *